US005477591A

United States Patent [19]

Morell

[11] Patent Number: 5,477,591

[45] Date of Patent: Dec. 26, 1995

[54] BEARING DEVICE FOR DRAFTING ROLLERS HAVING PRESSURE RELIEVING MEANS

[75] Inventor: Ricardo Morell, Barcelona, Spain

[73] Assignee: Hollingsworth Saco Lowell, Inc., Greenville, S.C.

[21] Appl. No.: 344,326

[22] Filed: Nov. 23, 1994

Related U.S. Application Data

[63] Continuation-in-part of Ser. No. 214,868, Mar. 17, 1994.

[51] Int. Cl.[6] .............................. D01H 5/56; F16C 23/00

[52] U.S. Cl. ................................ 19/294; 19/260; 19/267; 384/255

[58] Field of Search ............................ 19/260, 261, 262, 19/271, 294, 267; 384/255, 256

[56] References Cited

U.S. PATENT DOCUMENTS

| | | | |
|---|---|---|---|
| 1,145,516 | 7/1915 | Schmid-Roost . | |
| 1,286,936 | 10/1918 | Campbell . | |
| 1,685,218 | 9/1928 | Homans . | |
| 2,198,279 | 4/1940 | Weinberger | 19/130 |
| 2,610,363 | 9/1952 | Robinson et al. . | |
| 2,635,300 | 4/1953 | Butler | 19/142 |
| 2,678,475 | 4/1954 | Cotchett . | |
| 2,686,940 | 8/1954 | Burnham | 19/135 |
| 3,017,061 | 1/1962 | Hobart et al. | 384/255 X |
| 3,246,342 | 4/1966 | Morell | 19/258 |
| 3,395,427 | 8/1968 | Swanson | 19/272 |
| 3,409,944 | 11/1968 | Kajimura et al. | 19/762 |
| 3,467,450 | 9/1969 | Schmidt et al. | 384/255 X |
| 3,481,006 | 12/1969 | Burnham . | |
| 3,918,128 | 11/1975 | Katoh et al. | 19/260 |

FOREIGN PATENT DOCUMENTS

| | | | |
|---|---|---|---|
| 221393 | 5/1962 | Austria | 19/267 |
| 258874 | 4/1927 | Germany | 19/260 |
| 813920 | 7/1951 | Germany | 384/255 |
| 3732608 | 9/1987 | Germany | 19/267 |

*Primary Examiner*—John J. Calvert

*Attorney, Agent, or Firm*—Leatherwood Walker Todd & Mann

[57] ABSTRACT

A bearing device for use in textile drafting roller pairs for supporting the top roller of a drafting roller pair. The bearing device finds particular use with magnetic drafting rollers, but can be used with other types of roller configurations. The bearing device allows for the top roller to be selectively positioned with respect to the bottom roller in order to allow removal of the top roller and to prevent deformation of cots or aprons provided thereon during machine stoppage. A rotating debris excluding interface is also provided through interaction of the bearing device and the end of a roller. Handles are attached to the bearing device for allowing extraction of the top roller from a roller pair, and ribs may be provided on the bearing device or receptacle therefor to facilitate piecing up of a broken yarn. Related methods of use of the bearing device are also disclosed.

36 Claims, 4 Drawing Sheets

BEARING DEVICE FOR DRAFTING ROLLERS HAVING PRESSURE RELIEVING MEANS

BACKGROUND OF THE INVENTION

This application is a continuation-in-part of co-pending U.S. patent application Ser. No. 08/214,868, filed Mar. 17, 1994.

This invention relates generally to a bearing device for use with drafting rollers of a textile processing machine.

Rollers are used in a variety of mechanical devices, and are typically used for transporting or working, or both, material passing through the machine. Rollers find particular application in the paper manufacturing and printing industries, where they are found in paper-making machines, printing machines, copying machines, etc. Rollers also find numerous applications in the textile industry, where they are used for transporting and working fiber materials, and in particular, where they are used to stretch, or "draft", fiber strands in order to improve the uniformity of the fiber strands, both throughout the length of a particular fiber strand and also in relation from one fiber strand to another. Such uniformity is desirable as it ultimately leads to yarns of improved quality and consistency, which, in turn, results in improved fabric quality.

In a fiber spinning application, untwisted strands of fiber, known as "sliver", or strands of fiber with a slight twist, known as "roving", are introduced into a spinning machine (also known as a spinning "frame") where the strand of fibers is ultimately spun into a yarn. In a conventional ring-spinning frame, the fiber strands are brought into the spinning frame in either roving or sliver form. The roving or sliver then passes through at least two pairs of cooperating rollers, known as "drafting roller". The area between the drafting roller pairs is known as a "drafting zone". Upon entry into the drafting zone, the fibers are referred to as simply a fiber strand, and are subjected to drafting within the drafting zone.

Since the principal of drafting involves improving the uniformity of the fiber strand, the fiber strand is subjected to tension stresses within the drafting zone to aid in the reduction of any thick spots or other non-uniformities, and becomes elongated in the process. The tension forces applied to the fiber strand are caused by the fact that the downstream roller pair adjacent the drafting zone rotates a faster rate than the immediately upstream roller pair, which therefore causes the fiber strand to exit the drafting zone at a higher speed than at which it enters, thereby causing the strand to elongate within the drafting zone. Therefore, what starts out as a relatively thick fiber strand, in the form of sliver or roving, exits the drafting zone as a relatively thin strand of fibers. In ring spinning, the fibers exiting the final drafting zone of the spinning frame are generally twisted onto a rotating bobbin, the fiber strand then being known as a "yarn". Similar drafting arrangements can be used in other types of spinning operations, other than ring-spinning, for example, in mule, open-end and jet spinning.

Generally, each drafting roller pair of a spinning frame includes one driven roller, usually the lower roller, and the other roller is rotated due to its physical engagement at both ends with the driven roller. At each point of engagement, flexible rubber and/or plastic sleeves, also known as "cots," or belts, known as "aprons" or cot belts, are provided which actually engage the driven roller. At the interface of the cots or aprons with the driven roller, a knit zone is formed which grabs and propels the fiber strand forward. It is desirable to maintain the cots or belts in a flexible and smooth condition and in a manner such that flattened or warn spots are avoided.

During operation of the spinning frame, the cots and aprons tend to generally wear evenly. However, if the machine is shut down for a period of time, for example, over a weekend or during times of maintenance, it is desirable to separate the rollers in the drafting roller pairs such that the cots or aprons do not develop dented or flattened spots at the point of engagement in the nip zone while the machine is not in operation. The non-driven roller of each roller pair is generally the top roller, and is also generally provided with means for forcing it against the lower, driven roller in order to provide a snug nip zone for positively propelling the fiber strand. Conventional means for forcing the top roll onto the lower roll can involve weighting, spring pressure, or the use of magnetic top rolls which are attracted to the lower, driven rolls. An improved magnetic roller design is disclosed in my co-pending U.S. patent application Ser. No. 08/214,868, the disclosure of which is hereby incorporated herein by reference.

Because of the strong attraction of the magnetic rolls to the lower roll, it may be difficult for an operator to simply remove a magnetic top roll when the machine is shut down, and to also separate the top roll from the lower roll during a temporary stoppage, such as over a weekend, to the extent necessary to prevent dented flat spots from forming on the cots or aprons. It is also important to not separate the rolls to the point that the cots or aprons become disengaged with the twisted yarn. It would be undesirable for the twist in the yarn to move upstream into a drafting zone, which would likely occur if the rolls completely disengage the fiber strand.

For top rollers that are supported at their ends for rotation, another problem can arise in the supporting the roller ends. With respect to magnetic top rollers used in the past, orientation of one top roll as opposed to an adjacent top roll can be significant because with the prior designs, the top rolls could become demagnetized if not oriented properly with respect to adjacent top rolls. Therefore, certain prior magnetic rolls may be provided with end shafts, wherein the diameter of the shaft at one end of the roll is of different diameter than the shaft at the other end of the roll. By providing a holder for the roll having different sized slots for receiving the roller ends, improper orientation of the magnetic roll was virtually eliminated in that the roll would only fit within the holders when the shaft end diameters were matched with the proper slot in the holder. However, because the rollers had to be installed in a specific manner, installation time could be increased. With the new magnetic roller design as set forth in my co-pending U.S. patent application Ser. No. 08/214,868, incorporated by reference above, orientation of the new magnetic top rolls with respect to other top rolls is not critical. When using a prior art roller holder as described above, it would be desirable for an installer to be able to quickly place a magnetic roller with the bearing members attached, one on each end, into two respective receptacles without having to be concerned about the bearing members being in a particular configuration. In other words, ideally, the installer would be able to simply place a magnetic roller upon the bearing holder, and the magnetic roller bearing members would properly seat themselves into the receptacles automatically.

Relating to the present invention, in supporting magnetic rollers by their ends, particularly if the magnetic rollers are of the type having shafts extending therefrom for rotational support, it may be desirable to have a low friction bearing member which will receive the shafts and support the shafts for rotation. The bearing members would be received in receptacles, and may be stationary with respect to the receptacles, or, could rotate with the shaft ends. In either event, it is desirable to keep the interface between the shafts ends and bearing members clean to insure proper rotation of the rolls. Keeping such interfaces clean can be particularly difficult in a textile manufacturing environment, where dust, debris, fibers, and particulate matter may be found. Absent some means for keeping the interface free of debris, the rollers would likely require additional maintenance for cleaning purposes.

Additionally, when a drafting roller is supported at its ends, piecing up of a fiber strand which breaks while the spinning frame is in operation can be made more difficult. Operators having the requisite skill are often able to bring a portion of the yarn up from the bobbin and connect it to the fiber strand passing through the last drafting zone, thereby allowing piece-up of the yarn with the fiber strand in the last drafting zone. When using the prior magnetic roller designs, wherein shaft ends of the rollers are received directly in a receptacle, it was not difficult to work the yarn around a shaft end being held in the slot and back into the final drafting zone, for rejoining the yarn to a fiber strand therein.

However, if a bearing member is used, particularly a bearing member that is stationary with respect to the receptacle, dragging a yarn between the interface of the bearing member and the receptacle could result in sufficient friction to cause the yarn to break before it can be brought into the final drafting zone. Therefore, means for facilitating piece-up of the yarn is desired in a drafting roller system which uses bearing holder devices.

Roller-related devices have been patented and include that disclosed in U.S. Pat. No. 3,481,006, issued to Burnham, which discloses a magnetic drafting frame in which the top rolls have reduced end portions carrying sleeve elements and bearing block elements with anti-friction bearings therebetween. The bearing block elements of the top rolls are carried between legs of a support element carried on bars. U.S. Pat. No. 2,610,363, issued to Robinson, et al., discloses top rollers for use in a drafting frame. A shaft is carried in anti-friction bearing units, and each bearing unit includes an end portion having flats on an end thereof for receipt by a bearing block.

U.S. Pat. No. 1,286,936, issued to Campbell, discloses a spinning frame top roll having a central member and conical recesses for engaging conical cones. U.S. Pat. No. 1,145,516, issued to Schmid-Roost, discloses a dust guard for a shaft having an outer bush against which material is thrown by centrifugal force during rotation of the shaft.

U.S. Pat. No. 3,246,342, issued to Morrell, discloses a drafting roller having a thread on the ends thereof for assisting in piecing of a yarn. U.S. Pat. No. 2,686,940, issued to Burnham, discloses a magnetic roller bearing arrangement wherein bearing discs are provided which rest on steps of bars.

U.S. Pat. No. 1,685,218, issued to Homans, U.S. Pat. No. 2,198,279, issued to Weinberger, and U.S. Pat. No. 3,409,944, issued to Hiroshi Kajimura, et al., each disclose other patented roller bearing systems.

Even in view of the prior art devices, there exists a need for a bearing system which meets the objects and provides the features of the present invention, described in detail below.

SUMMARY OF THE INVENTION

It is a principal object of the present invention to provide a bearing device for supporting a roller.

It is another object of the present invention to provide a bearing device which displaces one roller with respect to another roller.

It is another object of the present invention to provide a bearing device which allows removal of a magnetic roller from a textile drafting system.

It is yet another object of the present invention to provide a bearing device which allows for reduction of pressure on a drafting roller cot or belt.

It is another object of the present invention to provide a bearing device which will automatically seat itself within a receptacle.

It is yet another object of the present invention to provide a bearing device which reduces entry of debris into an interface between the bearing device and a roller.

It is yet another object of the present invention to provide a bearing device which facilitates piece-up of a broken fiber strand in a drafting zone.

It is another object of the present invention to provide a bearing device which will move a receptacle a predetermined distance during separation of a pair of rollers.

It is still another object of the present invention to provide a bearing device having cam surfaces for allowing a top roller to be moved to different positions to accommodate different types of fiber strands.

Still another object of the present invention is to provide a bearing device having handles for allowing removal of a drafting roller.

Yet another object of the present invention is to provide a method of reducing debris at a bearing interface.

It is another object of the present invention to provide a method of changing the relative positions of rolls in a roller pair.

It is still another object of the present invention to provide a method for the self-seating of a bearing device.

A further object of the present invention is to provide a bearing device which securely attaches to a shaft of a roller.

And, it is still another object of the present invention to provide a method for piecing up a broken fiber strand.

The present invention includes a roller support system for use in connection with a receptacle defined in a support structure, the roller support system comprising a rotatable roller having a longitudinal roller central axis of rotation and two ends, at least one of the two ends defining a frusto-conically shaped cavity substantially coaxial with the roller central axis of rotation. The frusto-conically shaped cavity defines a first circumferentially extending interface.

A bearing member is provided having an outwardly extending frusto-conical portion defining a second circumferentially extending interface thereon for substantial coaxial receipt within the frusto-conically shaped cavity.

Further, the bearing member has a receptacle engaging portion for substantially stationarily engaging the receptacle of the support structure, such that the frusto-conically shaped cavity of the roller is receivable on the outwardly extending frusto-conical portion for rotation with respect to the bearing member and a support structure, and such that upon rotation of the roller, the first circumferentially extending interface moves in proximity about the second circumferentially extending interface.

More specifically, the roller may include a longitudinally extending shaft extending substantially coaxially with respect to the roller central axis of rotation into the frusto-conically shaped cavity, and the bearing member defines a shaft cavity for substantial coaxial receipt of the shaft upon receipt by the bearing member's frusto-conical portion of the frusto-conically shaped cavity of the roller.

The bearing member may also include a bearing member central axis and a shoulder portion, the shoulder portion having at least a first profile portion and a second profile portion. The first profile portion is a first distance from the bearing member central axis, and the second profile portion is a second distance from the bearing member central axis. Each of the first and second profile portions are selectively contactable with the receptacle of the support system upon rotation of the shoulder portion in the receptacle.

Further, the receptacle or bearing member may include at least one projection for spacing the bearing member away from a receptacle wall to facilitate insertion of a broken yarn.

A longitudinally extending debris excluding interface may be provided which includes the first and second circumferentially extending interfaces. The debris excluding interface has a first portion adjacent to the end of the roller, and a second portion disposed inwardly in a direction towards the middle of the roller, such that upon receipt of the first circumferentially extending interface by the second circumferentially extending interface. Upon rotation of the roller, the relative velocity between the first portion of the debris excluding interface and the second circumferentially extending interface is greater than the relative velocity between the second portion of the debris excluding interface and the second circumferentially extending interface.

The present invention also includes methods for minimizing indentations on roller cots by selectively releasing pressure between rollers of a drafting roller pair and also discloses a method for allowing self-seating of bearing devices by providing bearing devices having a profile for only engaging a receptacle in a particular orientation.

The present invention further includes a method for reducing entry of debris into a shaft/bearing interface by providing cooperating frusto-conical interfaces which, due to the relative velocity profile generated thereby, reduces the likelihood of entry of debris into the interface.

Moreover, the present invention discloses a method for piecing up a broken yarn by re-inserting into a draft zone of a spinning frame and by movement of the yarn between a bearing device and receptacle, at least one of which having a projection for spacing the bearing device from a portion of the receptacle portion.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which.

DESCRIPTION OF THE PREFERRED EMBODIMENT

Figure 1:
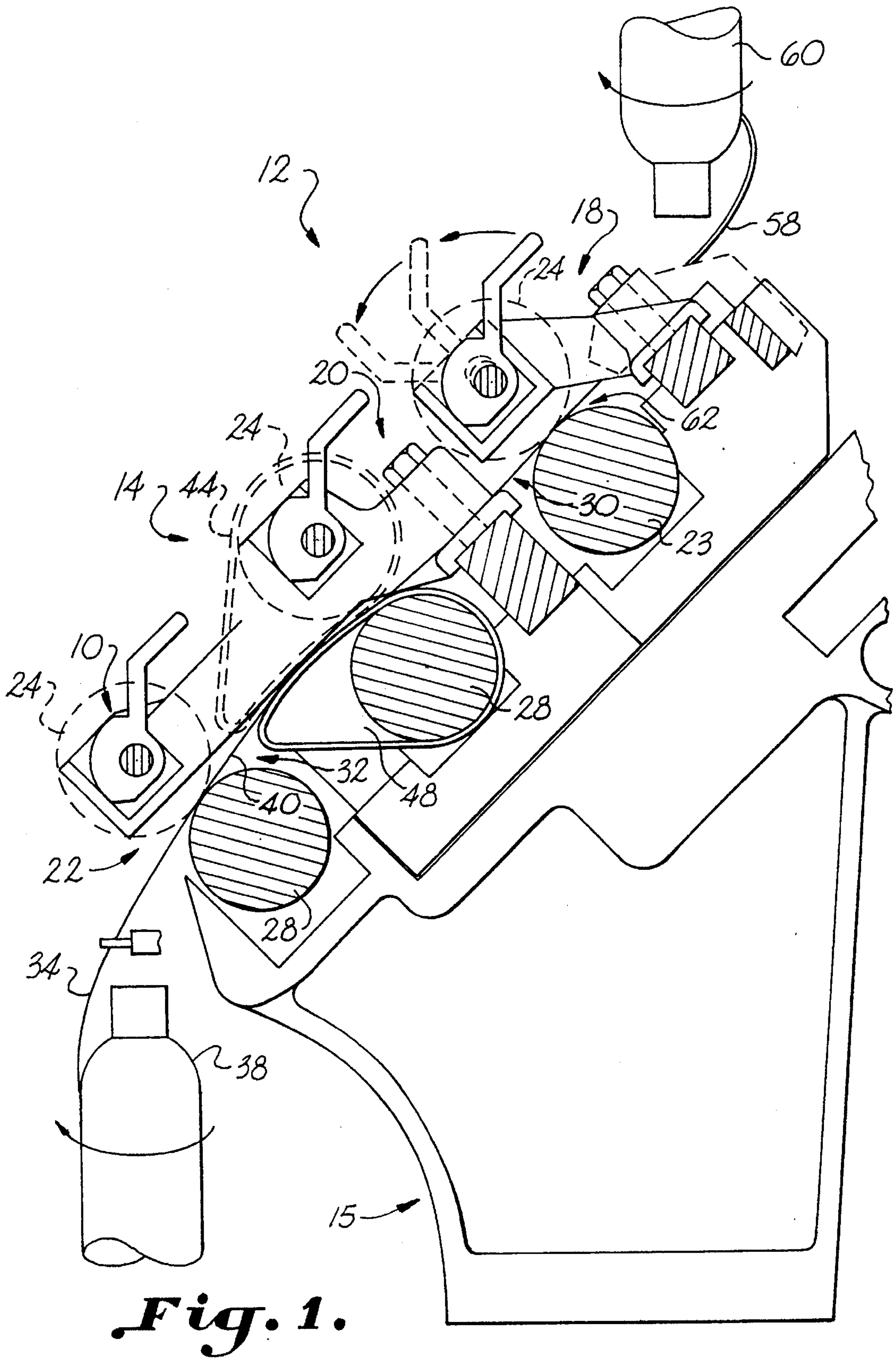
FIG. 1 is a side elevational view of a bearing device constructed in accordance with the present invention.

The accompanying drawings and the description which follows set forth this invention in a preferred embodiment. However, it contemplated that persons generally familiar with the art of machinery manufacture will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the bearing device of the present invention is indicated generally in the figures by reference character 10.

In FIG. 1, a spinning frame, generally 12, having a drafting system, generally 14, is illustrated. The spinning machine includes a frame support structure, generally 15, and three pairs of drafting rollers, generally 18, 20, 22, each pair having a top roller 24 and a bottom roller 28. The bottom rollers 28 this particular embodiment are rotationally driven, and the top rollers 24, which are preferably magnetic, are driven through engagement with the bottom rolls are driven by the bottom rolls. Of course, in other configurations the top roller could also be driven, or, the bottom roller could be rotated by a driven top roller, if desired. Generally, numerous drafting zones 30, 32 are provided side by side along the length of a spinning frame such that multiple bundles of yarn 34 can be spun on bobbins 38 (only one shown) at any given time. It is not uncommon for the bottom rolls 28 to be elongated and to extend through several parallel drafting systems, or, "stations" 14. However, the top rollers 24 typically extend across the width of one drafting station only, but, the top rolls generally engage a fiber strand 40 at each end thereof such that at any one drafting station, two fiber strands are being drafted simultaneously.

In the spinning frame shown in FIG. 1, it is preferable that magnetic rollers constructed in accordance with my copending U.S. patent application Ser. No. 08/214,868 be used, although the bearing device 10 of the present invention can be used with conventional magnetic rollers, spring-loaded rollers, weighted rollers, or other types of rollers. The bearing device 10 is also not limited to use in textile drafting applications, but could find application in numerous other machines, such as printing presses, paper-making machines, photocopy machines, other textile drafting machines, calendaring machines, or other machinery where rollers are used to transport and/or work material.

Each top roller 24 includes at each end (only one end shown) thereof a flexible, resilient sleeve 42 or belt 44, known as "cots" and "aprons", respectively. Cots 42 are illustrated in FIGS. 2 through 7, and aprons 44 are illustrated in FIG. 1. The aprons 44 rotate about stationary cradle 48 surfaces and are propelled by rotation of the top roll and bottom roll, as illustrated in FIG. 1.

The drafting roller pairs 18, 20, 22 define upstream, midstream, and downstream draft zones 30, 32, respectively, therebetween. Although a drafting station is shown in FIG. 1 having two drafting zones, it is to be understood that the present invention can be used in drafting stations having more or less than two drafting zones.

Figure 4:
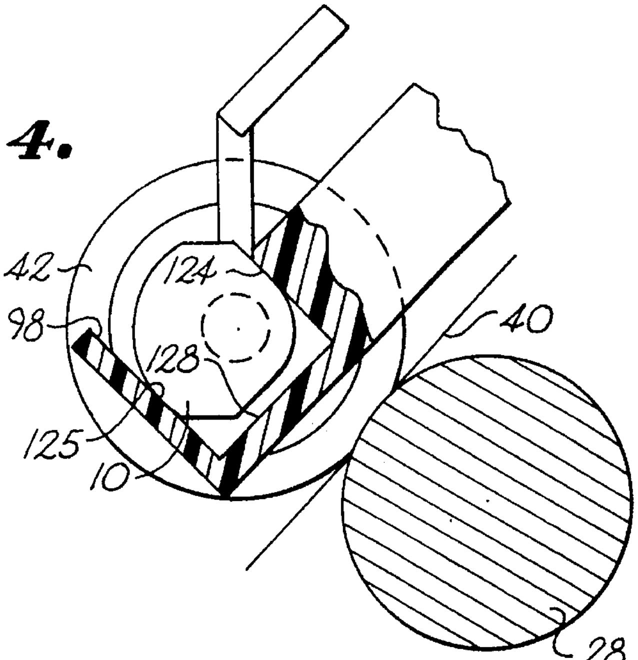
FIG. 4 is a side elevational view, with parts cut away, of a bearing device constructed in accordance with the present invention illustrating the position of a top roll of a drafting system when the drafting system is in operation.

In a typical spinning frame, fibers in the form of sliver or roving 58, from a bobbin 60, are introduced between the rollers of the upstream drafting roller pair 18 at the nip zone 62 formed therebetween. A nip zone includes the interaction between a cot 42 provided on the top roller 24 and the lower roller 28. As indicated in FIG. 4, which illustrates a top roller and bottom roller in an operational relationship, the flexible cot is actually depressed at the point it contacts with the lower roll. This forms a tight gripping interface at the nip zone 62 for grabbing and propelling the roving or sliver 58 into the first drafting zone. The aprons 44 act in a similar fashion in forming a nip zone at the midstream drafting roller pair 20. Likewise, the downstream roller pair 22 cots operate in similar manner as do the upstream roller cots.

Generally, assuming the upstream rollers 18 operate at a certain speed, the midstream rollers 20 operate at a faster speed than the upstream rollers, and the downstream rollers 22 operate at a still faster speed. This causes the fiber strand to be stretched or "drafted", in the first and second drafting zones 30, 32. The fiber strand thereby becomes elongated as it passes through the drafting zones 30, 32 such that the fiber strand exiting the downstream rollers is of a significantly thinner diameter than that entering the upstream roller pair 18.

Figure 3:
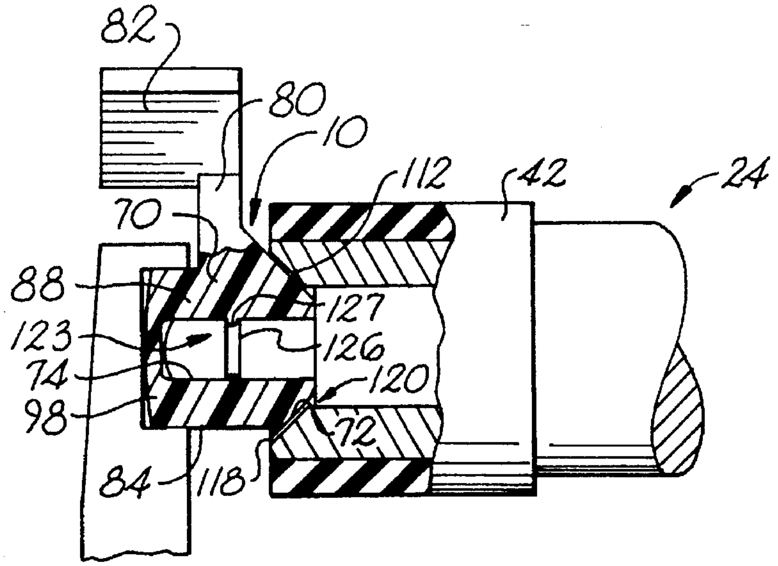
FIG. 3 is an elevational view, with parts cut away, of a bearing device constructed in accordance with the present invention.
Figure 2:
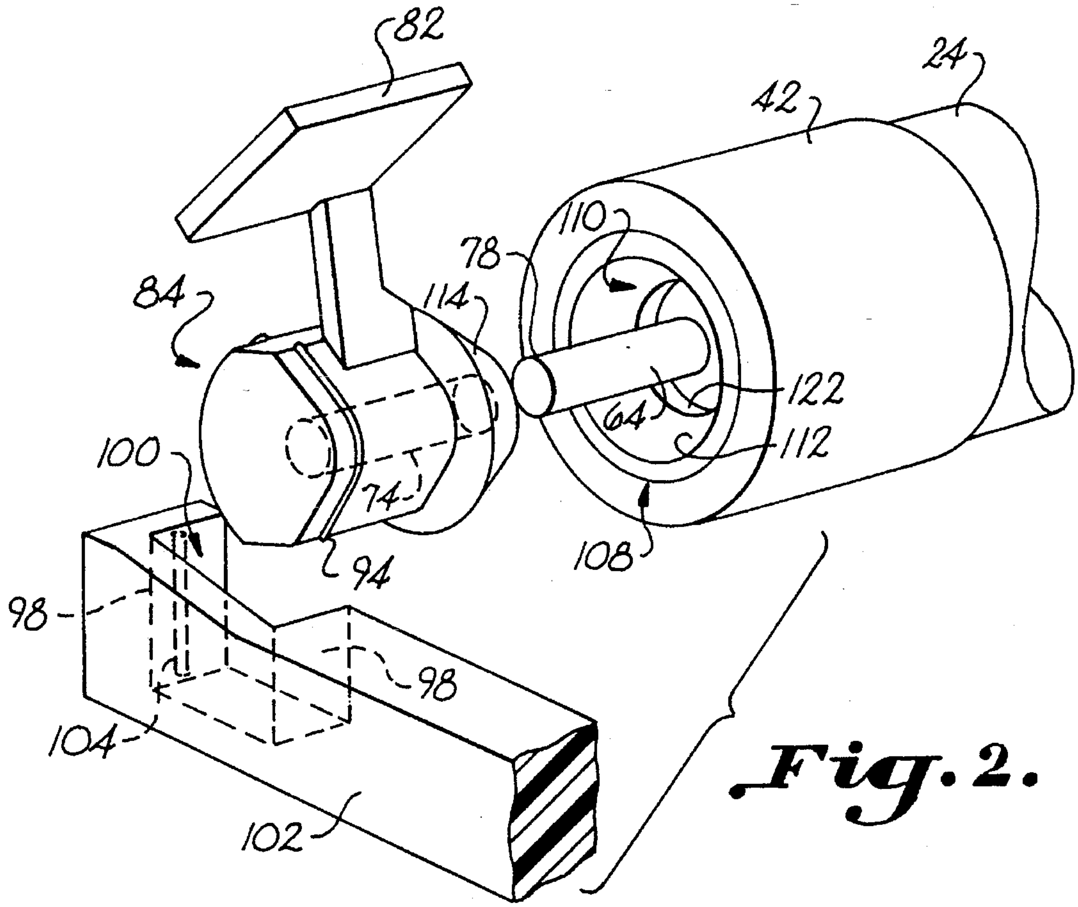
FIG. 2 is an exploded view illustrating placement of a bearing device constructed in accordance with the present invention in a receptacle.
Figure 7:
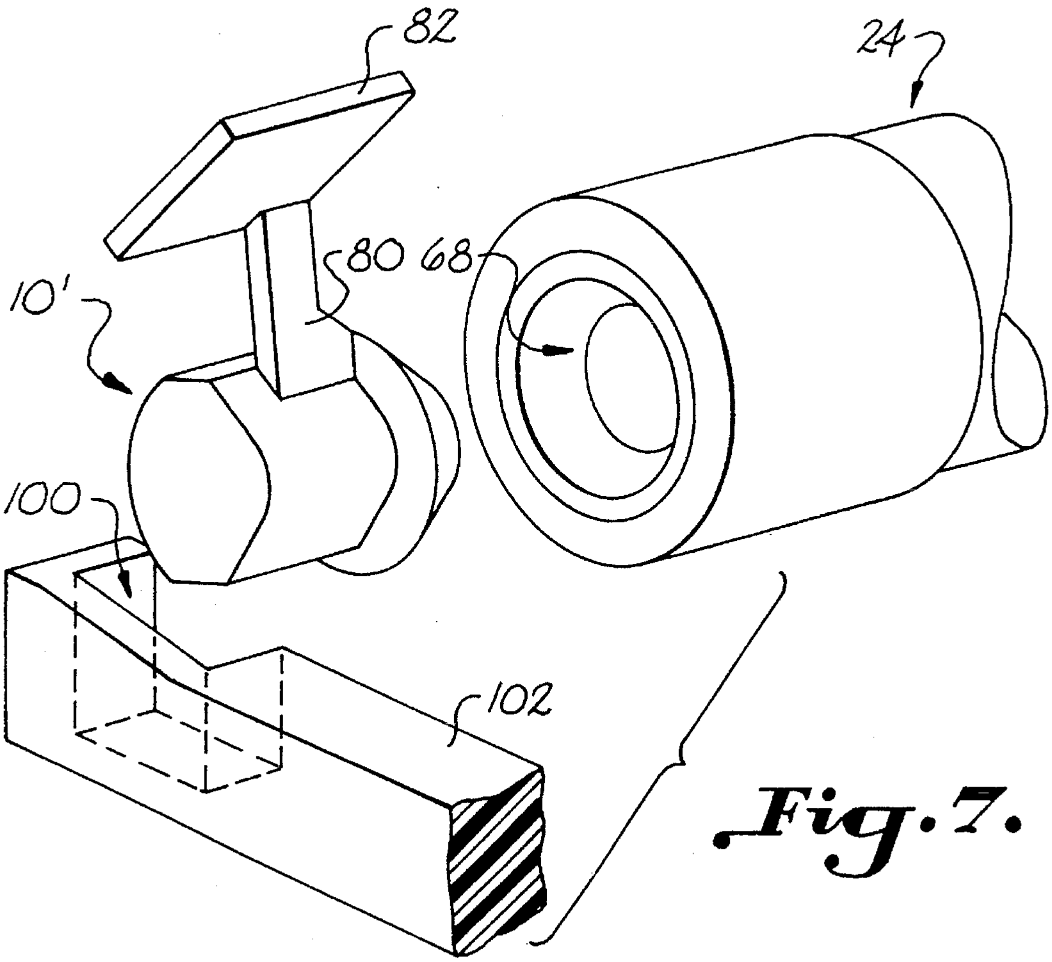
FIG. 7 is an exploded view of an alternate embodiment of a bearing device constructed in accordance with the present invention.

Turning to FIG. 2, bearing device 10, is clearly shown. Bearing device 10 receives the shaft 64 of a top roller, or alternately as shown in FIG. 7, the bearing device 10' may accept a roller end, generally 68 which has no shaft. Bearing device 10, as illustrated in FIGS. 2 and 3, includes a body member 70 having a frusto-conically shaped portion 72 extending outwardly therefrom. Defined in the body portion, and concentric with the frusto-conically shaped portion 72, is a bearing chamber 74 for receiving a shaft end 78 extending outwardly from a drafting roller. The shaft 64 may be configured to rotate with the drafting roller, or may be stationary with the roller rotating relatively thereto. Although only one end of the roller is shown, the other end and the bearing device system would be of the same or similar construction. Bearing device 10 can be molded or otherwise constructed of metal, plastic, or some other suitable material.

As shown in FIG. 3, extending outwardly from the body member of bearing device 10 is a lever arm 80 having a handle portion 82 at the end thereof. Turning to FIG. 2, defined on a peripheral profile, generally 84, of bearing device 10 is a shoulder portion 88 having several cam surfaces, generally 90, and several flat surfaces, generally 92, the operation of these to be described in more detail below. The shoulder portion 88 of bearing device 10 may also be provided with one or more ribs, ridges, projections, or the like, generally 94, for spacing the peripheral surfaces 84 of the bearing device 10 slightly away from one or more walls, generally 98, defining a receptacle, generally 100, in a support arm 102. Likewise, the walls 98 could also have such ribs 104 or the like in addition to or instead of those on the shoulder portion 88 of bearing device 10.

The drafting roller end, generally 108, also defines a frusto-conically shaped cavity 110 which is matingly received by the frusto-conically shaped portion 72 of the bearing device 10 during operation. The interface surfaces defined on the frusto-conically shaped portion of the bearing device and the frusto-conically shaped cavity of the roller, 112, 114 respectively, work together during operation to exclude entry of debris into the region between the interfaces. This is because the relative surface speed between the interfaces 112, 114 at the entry point 118 of the region, generally 120, is much greater than the relative speed of the interfaces at the base portion 122 of the cavity 110 in the end 108 of the roller. This configuration tends to throw out, by centrifugal force, any debris which may enter into the region, but more importantly, tends to prevent entry of debris in the region at the outset.

While mating frusto-conical surfaces and interfaces are illustrated in the figures, it is to be understood that variations of such surfaces could be made without departing from the teachings of the present invention. For example, instead of a frusto-conical shaped portion/cavity configuration, a parabolic shaped portion and correspondingly shaped cavity could also be used, the teaching being that the greatest relative speed between the bearing device and the end of the roller would be at the outermost end of the roller, which would tend to propel debris from entering into the region.

Retention means, generally 123, may be provided for attaching bearing device 10 to the shaft 64 of the roller. Numerous attachment means could be provided for connecting bearing device 10 to shaft 64, but as illustrated in FIG. 3, shaft 64 can be provided with a circumferentially extending groove 126 which matingly receives a rib portion 127, which may be circumferentially extending, segmented, or a single projection, for securing bearing device 10 to shaft 64. Preferably, rib 127 is resilient to the extent that shaft 64 may be inserted into the shaft chamber 74 of the bearing device, and upon rib 127 arriving at groove 126, rib 127 will snap into place within groove 126. It is desirable that the rib 127 be of less width than groove 126 such that rib 127 can move slightly side to side within groove 126, and accordingly, such that bearing device 10 can float side-to-side to a certain extent with respect to shaft 64. Alternately, instead of providing a rib or projection within the shaft chamber of bearing device 10, the chamber could be provided with a circumferentially extending groove (not shown) and shaft 64 provided with a projection, ring, or other device for receipt in the groove, which would serve the same purpose of retaining bearing device 10 to shaft 64.

Figure 5:
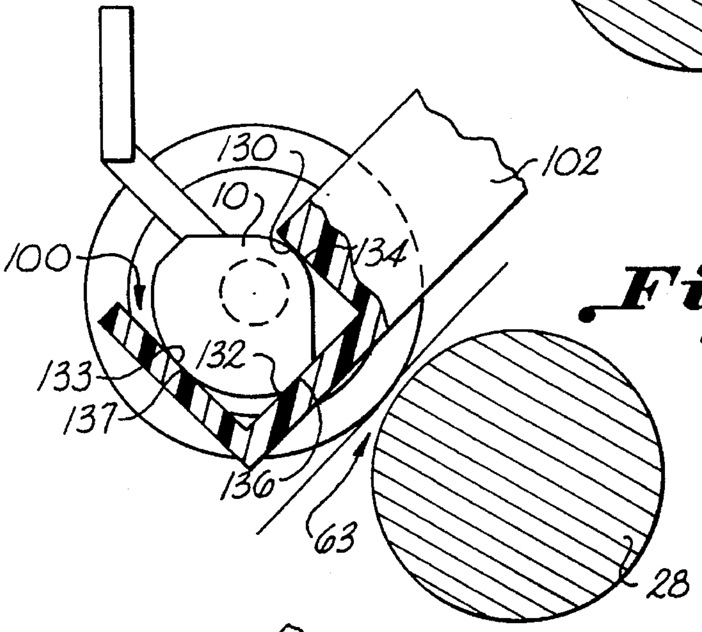
FIG. 5 is a side elevational view, with parts cut away, of a bearing device constructed in accordance with the present invention in a position for holding a drafting roll in a temporary stoppage-type position.
Figure 6:
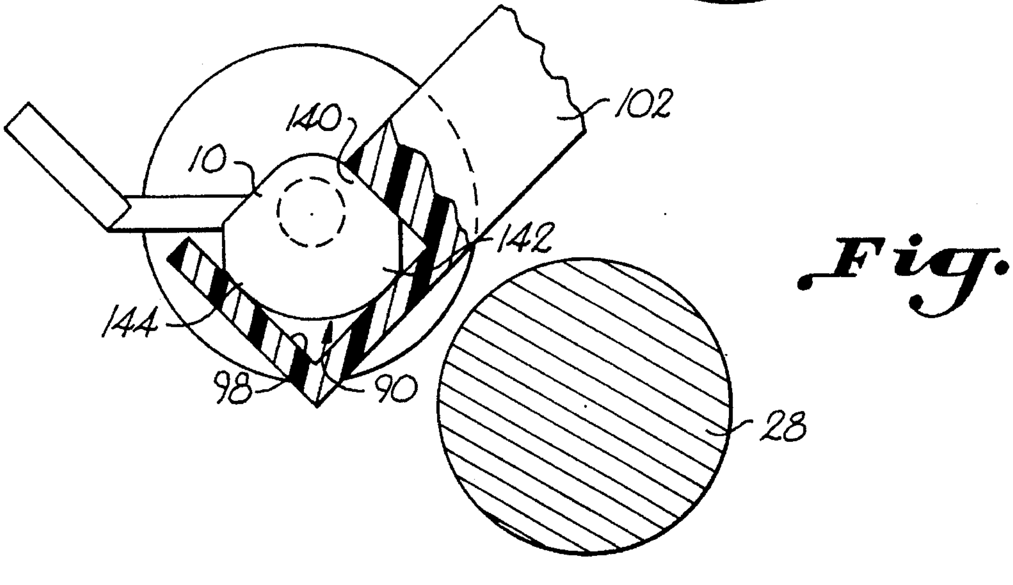
FIG. 6 is a side elevational view, with parts cut away, of a bearing device constructed in accordance with the present invention, in a position for allowing removal of a roll from a drafting system.

Turning now to FIGS. 4 through 6, the interaction between the cam surfaces 90 of bearing device 10 and the receptacle 100 of the support arm 102 will be discussed. FIG. 4 illustrates the relationship between the cam surfaces 90 of bearing device 10 when a top drafting roller 24 is in an operation, or "run", configuration. As illustrated, the cot 42 is making proper engagement with the lower roll 28 for engaging in propelling a fiber strand. Of course, bearing device 10 could also be used in connection with a roller having an apron instead of a cot. This configuration is desirable and results in generally even wear of the cot or apron as the machine operates. However, when the machine is to be stopped for a limited period of time, the depression of the cot or apron at the engagement point with the lower roller can cause a dent or dimple to be formed in the cot or apron, such that upon start-up of the machine, the dimple will interfere with uniform drafting of the fiber strand.

FIG. 5 illustrates operation of the bearing device 10 10 in slightly separating the cot 42 from the lower roll 24 when the spinning frame is stopped for a limited period of time, such as over a weekend, holiday, or during maintenance of the spinning frame. As illustrated in FIG. 5, the cot is separated just slightly from the lower roll 28, but is still in engagement with the fiber strand therebetween. It should be noted that while the top roller 24 is illustrated as being moveable to other positions, the rollers could be reversed such that the top roller was stationary and the bottom roller was moveable, if desired. The engagement with the fiber strand is preferably such that any twist which may exist downstream of the nip zone 63 is not transferred through the nip zone upstream into the upstream portion of the fiber strand, which would, consequently, interfere with upstream drafting of the fiber stream after the machine resumes operation.

The difference between spacing of the top roll with respect to the bottom roll illustrated in FIGS. 4 and 5 is caused by the difference in interaction between the camming surfaces 90 of bearing device 10 and the receptacle walls 98. For example, in FIG. 4, the portions 124,125 of the camming surfaces, which are defined on the bearing device shoulder 88, are contacting the walls 98 of the receptacle 100 with the shaft of the roller being a predetermined distance above the reference surface, or floor 128, of the receptacle 100. By rotating the bearing device 10 in a counterclockwise direction, as shown from FIGS. 4 and 5, portions 130, 132, 133 of the bearing device shoulder contact wall surfaces 134, 136, and 137 and reference floor 128, and in the process, the top roller is lifted away from the lower roll such that a fiber strand will continue to be gripped in the nip zone between the rollers. However, the top roller 24 will be moved far enough from the bottom roller such that there is no depression, or only minimal depression of the cot 42 at the point of engagement between the rollers. This will prevent the cot from experiencing any harmful deformation during the machine stoppage. When the machine is to be restarted, the lever is simply rotated in a clockwise position backed to the position as illustrated in FIG. 4, wherein the cot, or apron, as the case may be, is depressed by the lower roller.

Turning now to FIG. 6, a third position of the bearing device is illustrated. In this position, the bearing device has been rotated counterclockwise even further than as illustrated in FIG. 5, with portions 140, 142, 144 of the shoulder contacting wall portions 134, 136, 137, respectively, of the receptacle 100. In this configuration, the top roller is spaced entirely away from the bottom roller by an amount sufficient to allow removal of the top roller. In this position there would be little or no contact between the cot and the fiber strand passing through the nip zone.

The top roller removal position is especially significant if a magnetic drafting roller such as disclosed in my copending U.S. patent application Ser. No. 08/214,868, incorporated by reference above, is used, due to the unusually strong magnetic attraction afforded by such a drafting roller design. The separation of the rollers provided by the configuration illustrated in FIG. 6 allows for removal of the top roller by simply grabbing of the top roller and pulling, or alternately, in using another feature of the present invention, by grabbing the handles 82 of the bearing devices and pulling on them to simultaneously remove the top roller and the bearing devices 10 from a drafting zone. Use of the handles 82 to extract the drafting roller facilitates removal of the drafting roller without the operator sticking his or hand into the drafting zone.

Figure 8:
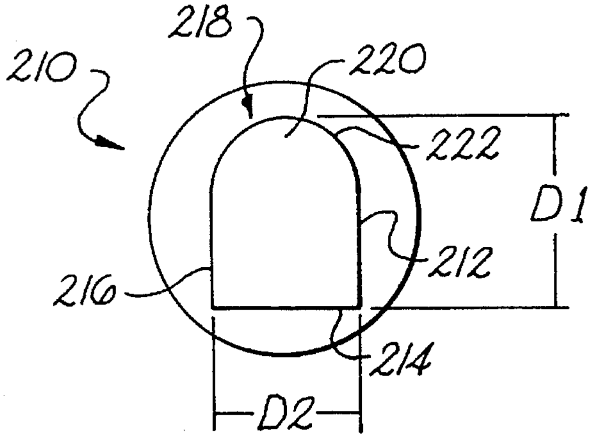
FIG. 8 is a partial side elevational view of an alternate embodiment of a bearing device.

An end view of an alternate embodiment bearing device 210 constructed in accordance with the present invention is illustrated in FIG. 8. In this embodiment, a lever arm and camming surfaces are not shown, but could be provided. Three sides 212,214, 216 of the end 218 of the bearing device 210 are configured to seat within the receptacle 100, while a third side 220 is oversized, and preferably has a curved profile 222 such that a cross-section of the bearing device has a modified D-shaped profile. In other words, one width dimension D1 of the end of the bearing device is larger than another width dimension D2. By providing such a configuration for the end of this type of bearing device 210, an operator may simply slip the bearing devices 210 on the ends of a drafting roller and place the ends adjacent the receptacle 100 of the support arm. Once the drafting roller begins to rotate, the bearing devices 210 will also rotate, if they did not initially seat within the receptacle, until the D2 dimension is received within the receptacle. This is because the receptacle 100 is sized to receive the D2 dimension portion of the bearing device, but is too small to receive the D1 dimension portion of the bearing device. Thus, the bearing devices 210 will, in a limited amount of time, seat themselves within the receptacles, thereby facilitating positioning of the drafting rollers. It is to be understood, however, that various other profiles could also be provided instead of the D-shape, which would offer similar results.

Another important feature provided by the present invention is the design of the support arms 102, which are designed to have flexibility and to actually flex a predetermined amount during movement of the bearing devices within the receptacles. As illustrated in FIG. 5, as the bearing device is rotated from the "run" position illustrated in FIG. 4 to the "stoppage" position illustrated in FIG. 5, the support arm 102 will be forced downwardly a predetermined amount until it contacts a portion of the spinning frame, or, as illustrated, the lower drafting roll 28 associated with the top roll being moved. Upon the support arm contacting the lower roll 28, the receptacle provides substantially stationary reference surfaces against which the camming surfaces 90 of the bearing device may bear in lifting the magnetic roller upwardly from the bottom roller. The same flexing downwardly of the support arm could occur when the roller is moved from the stoppage position to the "removal" position, illustrated in FIG. 6. Because the distance between the bottom of the support arm and the lower roll is a known distance, the floor 128 of the receptacle 100 acts as a type of gauge surface. The floor 128, in connection with the camming surfaces of the bearing device, raise the top roll by a predetermined amount sufficient to insure grasping of the fiber strand in a nip zone therebetween, but not to the extent that any twist which may exist in the downstream portion of the fiber strand would be transported upstream. This configuration is shown in FIG. 5. While the support arm is illustrated as being a substantially cantilever design, it is to be understood that a rigid support structure could be used instead, which would not flex downwardly, to provide reference points for the cam surfaces. Alternately, the support arm could move downwardly in another manner other than that afforded by the cantilever structure illustrated, and could use a coil or leaf spring or other means to allow relatively precise movement of the roll.

As illustrated in FIG. 2, ribs or projections 94 which can be provided on the shoulder profile 88 of bearing device 10 and/or the receptacle walls, effectively provide a gap 150 between the shoulder 88 and the receptacle walls for allowing insertion of a fiber strand therein.

If a fiber strand were to break during drafting, an operator could potentially rejoin the broken fiber strand with the fiber strand passing through a drafting zone upstream of the adjacent drafting roller. In re-piecing the fiber strand, the operator would pull the yarn into the gap 150 formed between the shoulder and the receptacle walls, around and beneath the end of the bearing device, and potentially along the opposite side of the bearing device shoulder surfaces, and then into the adjacent drafting zone. The operator would grasp the fiber strand being fed into the drafting zone and would work it together with the broken end (not shown) to reconnect the fiber strand. By providing the ribs on the shoulder portions and/or receptacle walls, prolonged frictional contact between the bearing device, fiber strand, and receptacle walls is minimized. In passing around and underneath the shoulder portions of the bearing device, the fiber strand will only have to clear the ribbed portions 94, which are the points where the bearing device actually contacts the receptacle. While the forces may be concentrated at these ribbed points, it is anticipated that this will provide less of breakage problem than would be the case caused by a prolonged dragging of the fiber strand between a continuous bearing device shoulder-receptacle wall and floor interface, thereby improving the likelihood of piecing up a broken fiber strand. In other words, use of the ribs would likely lessen the risk of breaking the yarn while bringing the yarn into the drafting zone.

Although only three top roller positions have been discussed, namely the run, stoppage, and removal positions, it is to be understood that the bearing device 10 can be provided with multiple cam surfaces, if desired, to allow for a variety of spacings between the top roller and bottom roller, if desired. Additional cam surfaces, or one continuous lobe-shaped cam surface, or the like, could allow for such variations, and may be desired for using the magnetic rollers with fiber strands of different diameters, compositions, characteristics, etc., and for different operational constraints.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the following claims.

What is claimed is:

1. A drafting roller support system for use in connection with a receptacle defined in a support structure, the roller support system comprising:

a rotatable roller having a central axis of rotation and two ends, at least one of said two ends defining a partially conical cavity substantially coaxial with said central axis of rotation; said partially conical cavity defining a first interface surface;

a bearing member having an outwardly extending partially conical portion defining a second interface surface thereon for substantial coaxial receipt within said frustoconical cavity of said roller, such that said partially conical cavity of said roller is receivable on said outwardly extending partially conical portion for rotation with respect to said bearing member, and such that upon rotation of said roller, said first interface surface moves in proximity about said second interface surface.

2. A drafting roller support system as defined in claim 1, further comprising said bearing member having a receptacle engaging portion for substantially stationarily engaging the receptacle of the support structure.

3. A drafting roller support system as defined in claim 1, further comprising:

said roller including a longitudinally extending shaft extending substantially coaxially with respect to said roller central axis of rotation into said partially conical cavity; and said bearing member defining a shaft cavity for substantial coaxial receipt of said shaft upon receipt of said partially conical cavity of said roller by said partially conical portion of said bearing member.

4. A drafting roller support system as defined in claim 1, wherein said bearing member is of integral, unitary construction.

5. A drafting roller support system as defined in claim 1, wherein said bearing member includes a bearing member axis and a shoulder portion; said shoulder portion having at least a first profile portion and a second profile portion, said first profile portion being a first distance from said bearing member axis and said second profile portion being a second distance from said bearing member axis, each of said first and second profile portions being selectively contactable with the receptacle of said support system upon rotation of said shoulder portion in the receptacle substantially about said bearing member axis.

6. A drafting roller support system as defined in claim 1, wherein said first interface surface extends substantially circumferentially about said partially conical cavity, and said second interface surface extends substantially circumferentially about said partially conical portion.

7. A drafting roller support system as defined in claim 1, further comprising an outwardly extending lever arm connected to said bearing member.

8. A drafting roller support system as defined in claim 1, further comprising a handle connected to said bearing member for allowing removal of said bearing member and the roller from the receptacle.

9. A drafting roller support system as defined in claim 2, wherein said receptacle engaging portion includes a first portion of greater width than the receptacle and a second portion of substantially the same width as the receptacle.

10. A drafting roller support system as defined in claim 2, wherein said receptacle engaging portion includes at least one projection for engaging the receptacle when said receptacle engaging portion is received by the receptacle.

11. A drafting roller support system as defined in claim 1, further comprising retention means associated with said bearing member and said roller for retaining said bearing member adjacent to said roller.

12. A drafting roller system as defined in claim 3, further comprising retention means associated with said bearing member and said shaft for retaining said bearing member on said shaft.

13. A drafting roller support system as defined in claim 12, wherein said retention means includes said shaft defining a groove and said bearing member defining a projection for receipt in said groove of said shaft.

14. A drafting roller support system as defined in claim 1, wherein said rotatable roller includes at least one magnet.

15. A roller support system, comprising:

a longitudinally extending support arm, said support arm defining a receptacle;

a rotatable roller having a central axis of rotation and two ends, at least one of said two ends defining a partially conical cavity substantially coaxial with said central axis of rotation; said partially conical cavity defining a first interface surface;

a bearing member having an outwardly extending partially conical portion defining a second interface surface thereon for substantial coaxial receipt within said partially conical cavity; and said bearing member having a receptacle engaging portion for substantially stationarily engaging said receptacle of said support structure, such that said partially conical cavity of said roller is receivable on said outwardly extending partially conical portion for rotation with respect to said bearing member and said support structure, and such that upon rotation of said roller, said first interface surface moves in proximity about said second interface surface.

16. A roller support system as defined in claim 15, wherein said receptacle is substantially box-shaped having at least one open end and at least one open side.

17. A roller support system as defined in claim 15, wherein said receptacle defines at least one projection for engaging with said receptacle engaging portion of said bearing member.

18. A roller support system as defined in claim 15, wherein said longitudinally extending support arm is moveable and may be moved downwardly a predetermined distance.

19. A roller support system, comprising:

a rotatable roller having a central axis of rotation, two ends, and a central portion between said two ends; at least one of said two ends defining a first interface surface;

a bearing member defining a second interface surface for receiving said first interface surface of said roller; and a debris excluding interface including said first and second interface surfaces, said debris excluding interface defining a first region adjacent said end of said roller and a second region disposed inwardly in a direction towards said central portion of said roller, such that upon receipt of said first interface adjacent said second interface surface, and upon rotation of said roller, the relative velocity between said first and second interface surfaces in said first region is greater than the relative velocity between said first and second interface surfaces in said second region.

20. A roller support system as defined in claim 19, wherein said first interface surface includes a frusto-conical cavity defined in said end of said roll, said frusto-conical cavity being substantially coaxial with said roller central axis of rotation; and said bearing member having an outwardly extending frusto-conical portion defining said second interface surface, said frusto-conical portion being for substantial coaxial receipt within said partially conical cavity of said roller.

21. A roller support system as defined in claim 19, wherein said receptacle engaging portion of said bearing member includes a partially rounded shoulder portion defining first and second substantially planar surfaces, said first and second planar surfaces being substantially diametrically opposed from one another.

22. A roller support system as defined in claim 21, wherein said shoulder portion of said receptacle engaging portion defines a first curved camming surface extending substantially between said first and second planar surfaces.

23. A roller support system as defined in claim 21, wherein said shoulder portion of said receptacle engaging portion defines a second curved camming surface located between said first and second planar surfaces.

24. A drafting roller support system for supporting a pair of rotatable drafting rollers, said drafting roller support system comprising:

a frame support structure;

first and second rotatable drafting rollers; said first roller having a roller axis of rotation and two ends, at least one of said two ends defining a partially conical cavity substantially coaxial with said roller axis of rotation; said partially conical cavity defining a first interface surface; said second rotatable roller being supported in said support structure for rotation;

a support arm, said support arm defining a receptacle;

a bearing member having an outwardly extending partially conical portion defining a second interface surface thereon for substantial coaxial receipt within said partially conical cavity of said first roller; and said bearing member having a receptacle engaging portion for substantially stationarily engaging said receptacle of said support arm, such that said partially conical cavity of said first roller is receivable on said outwardly extending partially conical portion for rotation with respect to said bearing member and said support arm, and such that upon rotation of said first roller, said first interface surface moves in proximity about said second interface surface.

25. A drafting roller as defined in claim 24, wherein said first roller includes at least one magnet.

26. A roller support system for supporting the end of a roller for rotation, the roller support system comprising:

a bearing member for supporting the end of the roller;

a receptacle for receiving said bearing member, said receptacle defining a reference surface and first and second contact portions for contacting said bearing member;

said bearing member defining a first cam surface for contacting said first contact portion of said receptacle and a second cam surface for contacting said second contact portion of said receptacle, such that upon said first cam surface of said bearing member contacting said first contact portion of said receptacle, the roller is a first predetermined distance from said reference surface of said receptacle, and upon said second cam surface of said bearing member contacting said second contact portion of said receptacle, the roller is a second predetermined distance from said reference surface of said receptacle; and bearing member rotation means associated with said bearing member for rotating said bearing member between a first position, wherein said first cam surface contact said first contact portion, and a second position, wherein said second cam surface contact said second contact portion.

27. A roller support device as defined in claim 26, further comprising said receptacle being configured for displacement with respect to said bearing member, such that upon rotation of said bearing member rotation means between said first and second positions, said receptacle is displaced by a predetermined distance.

28. A method for supporting the end of a drafting roller having a roller axis, and for selectively varying the distance between the drafting roller and a reference surface, the method comprising:

providing the end of the drafting roller with a bearing member having first and second cam surfaces, each of said first and second cam surfaces being spaced a different distance from the roller axis;

positioning the bearing member in a receptacle such that said first cam surface of the bearing member contacts the receptacle and the roller axis is a first corresponding distance from the reference surface; and moving the bearing member about said receptacle such that said second cam surface contacts said receptacle, thereby moving of the roller axis to a second corresponding distance from the reference surface.

29. A method as defined in claim 28, wherein said moving of said bearing member includes rotating said bearing member within said receptacle.

30. A method as defined in claim 28, wherein moving said bearing member includes rotating said bearing member within said receptacle with an arm connected to said bearing member.

31. A method of seating an end of a drafting roller in a receptacle, comprising:

providing the end of the drafting roller with a bearing member having a first portion of a first width and a second portion of a second width, wherein said first width is greater than the width of the receptacle, and said second width is less than the width of the receptacle;

positioning the end of the roller adjacent the receptacle such that said first portion of said bearing member is adjacent the receptacle; and rotating the roller such that said second portion of said bearing member registers with and is received by the receptacle.

32. A method as defined in claim 31, wherein said providing of said bearing member includes providing a bearing member with said second portion having a curvature.

33. A method for excluding debris from a roller and bearing, comprising:

providing a roller end defining a partially conical cavity;

providing a bearing member having a partially conical portion;

inserting said partially conical portion of said bearing member into said partially conical cavity of the roller end; and rotating the roller with respect to said bearing member, such that said partially conical cavity rotates with respect to said partially conical portion, thereby defining a debris excluding interface therebetween.

34. A method as defined in claim 33, wherein providing said roller end includes providing a roller having an outwardly extending shaft and wherein providing said bearing member includes providing said bearing member having a shaft chamber for receiving the shaft of the roller; and said method further including inserting said shaft in said shaft chamber.

35. A spinning frame for spinning a fiber strand, the spinning frame comprising:

a support structure;

a first pair of drafting rollers associated with said support structure for receiving a fiber strand;

means associated with said support system for delivering a fiber strand to said first pair of drafting rollers;

a second pair of drafting rollers associated with said support structure, said second pair of drafting rollers being positioned downstream from said first pair of drafting rollers and defining a drafting zone between said first and second pair of drafting rollers;

means for rotating said first and second drafting roller pairs to produce a speed differential therebetween;

means associated with said support structure for spinning the fiber strand upon the fiber strand exiting said second pair of drafting roller;

at least one roller of one of said first and second pair of drafting rollers having an end defining a partially conical cavity substantially coaxial with the axis of rotation of said at least one roller, said partially conical cavity defining a first interface surface; and a bearing member having an outwardly extending partially conical portion defining a second interface surface thereon for substantial coaxial receipt within said partially conical cavity of said roller, such that said partially conical cavity of said at least one roller is receivable on said outwardly extending partially conical portion for rotation with respect to said bearing member, and such that upon rotation of said at least one roller, said first interface surface moves in proximity about said second interface surface.

36. A drafting system for drafting a fiber strand in a spinning frame, the drafting system comprising:

a support structure;

a first pair of drafting rollers associated with said support structure for receiving a fiber strand;

a second pair of drafting rollers associated with said support structure, said second pair of drafting rollers being positioned downstream from said first pair of drafting rollers and defining a drafting zone between said first and second pair of drafting rollers;

means for rotating said first and second drafting roller pairs to produce a speed differential therebetween;

at least one roller of said first and second pair of drafting rollers having an end defining a partially conical cavity substantially coaxial with the axis of rotation of said at least one roller, said partially conical cavity defining a first interface surface; and a bearing member having an outwardly extending partially conical portion defining a second interface surface thereon for substantial coaxial receipt within said partially conical cavity, such that said partially conical cavity of said at least one roller is receivable on said outwardly extending partially conical portion for rotation with respect to said bearing member, and such that upon rotation of said at least one roller, said first interface surface moves in proximity about said second interface surface.

* * * * *